United States Patent
Gravino et al.

(10) Patent No.: US 10,356,035 B1
(45) Date of Patent: Jul. 16, 2019

(54) RECOMMENDATION SYSTEM BASED ON COMMON INTERESTS IN SOCIAL NETWORKS

(71) Applicant: Cox Communications, Inc., Atlanta, GA (US)

(72) Inventors: Douglas D. Gravino, Roswell, GA (US); Ryan M. S. Baker, Lilburn, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 12 days.

(21) Appl. No.: 13/945,194

(22) Filed: Jul. 18, 2013

Related U.S. Application Data

(60) Provisional application No. 61/788,701, filed on Mar. 15, 2013.

(51) Int. Cl.
 *G06F 15/16* (2006.01)
 *H04L 12/58* (2006.01)

(52) U.S. Cl.
 CPC .................... *H04L 51/32* (2013.01)

(58) Field of Classification Search
 CPC ......... G06Q 10/10; H04L 29/06; H04L 29/08; H04L 51/32
 USPC .......................... 709/204, 205, 206, 207, 217
 See application file for complete search history.

(56) References Cited

U.S. PATENT DOCUMENTS

| | | | |
|---|---|---|---|
| 8,447,852 B1* | 5/2013 | Penumaka | G06Q 50/01 709/217 |
| 8,489,515 B2* | 7/2013 | Mathur | G06Q 50/01 705/319 |
| 8,560,678 B2* | 10/2013 | Tseng | 709/224 |
| 2008/0147659 A1* | 6/2008 | Chen et al. | 707/7 |
| 2008/0167016 A1* | 7/2008 | Swanburg | H04M 3/4872 455/414.1 |
| 2011/0288912 A1* | 11/2011 | McCrea et al. | 705/14.2 |
| 2013/0067081 A1* | 3/2013 | Liu et al. | 709/225 |
| 2014/0101243 A1* | 4/2014 | Naveh et al. | 709/204 |
| 2014/0280116 A1* | 9/2014 | Chen | G06Q 10/10 707/732 |
| 2017/0024765 A1* | 1/2017 | Barenholz | G06Q 30/0255 |

* cited by examiner

*Primary Examiner* — Liang Che A Wang
*Assistant Examiner* — Kaylee J Huang
(74) *Attorney, Agent, or Firm* — Merchant & Gould

(57) ABSTRACT

Social network friend-based recommendations are provided. Based on user consumption data provided by one or more service providers, a determination may be made as to which social network contacts a user has who may have preferences for video, music, and other media that are close to the user's. The determination of social network contacts who share a common interest and the user consumption data of those social network contacts may be utilized to infer recommendations for the user. Other functionalities may be provided, such as manual recommendations, placing emphasis on recommendations from particular friends, email notifications of content that a friend has consumed that the user has not, an option to view what a social network contact is viewing, providing a list of programs that the user and a social network contact have both seen, and providing advertisements based on consumption data, recommendations, and/or discovered areas of interest.

22 Claims, 5 Drawing Sheets

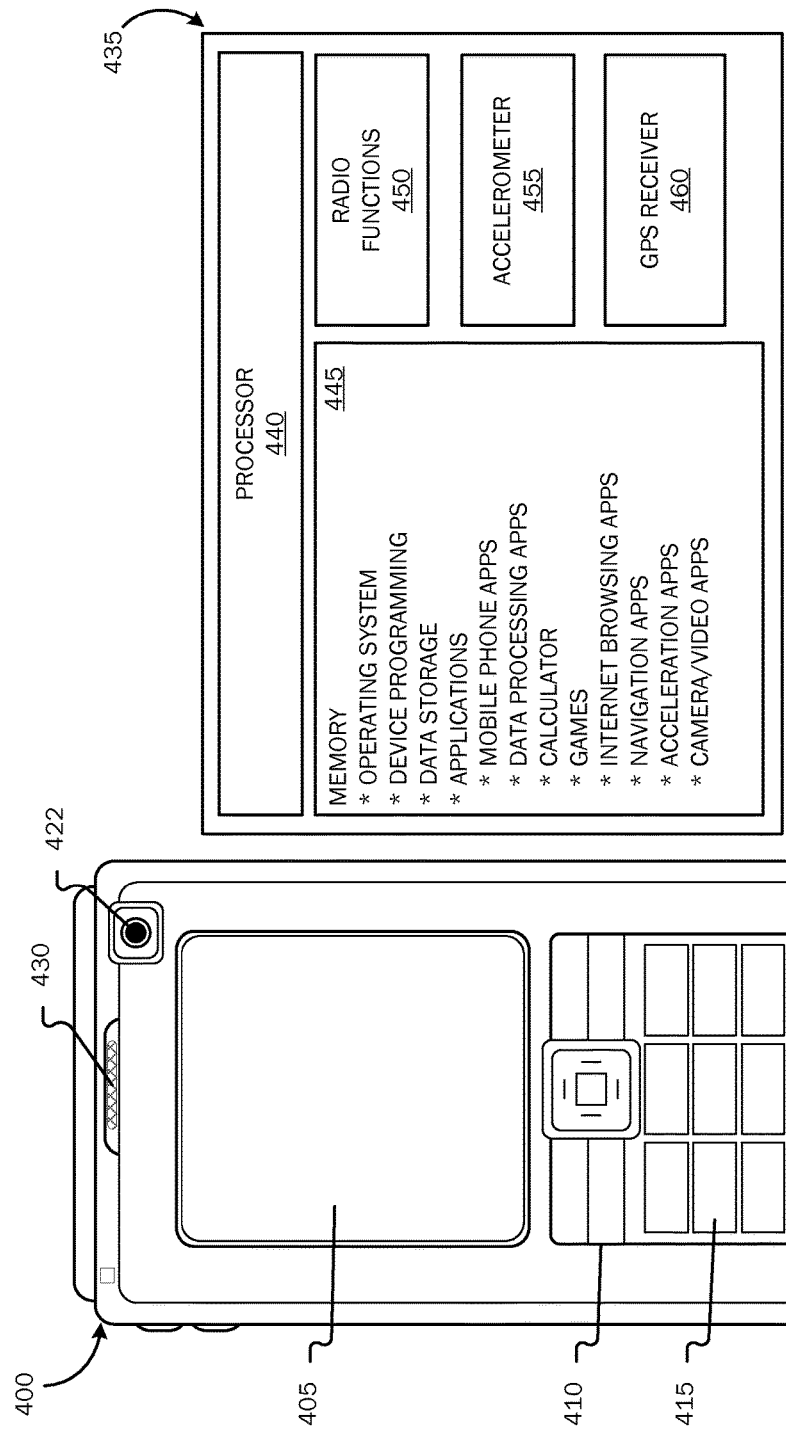

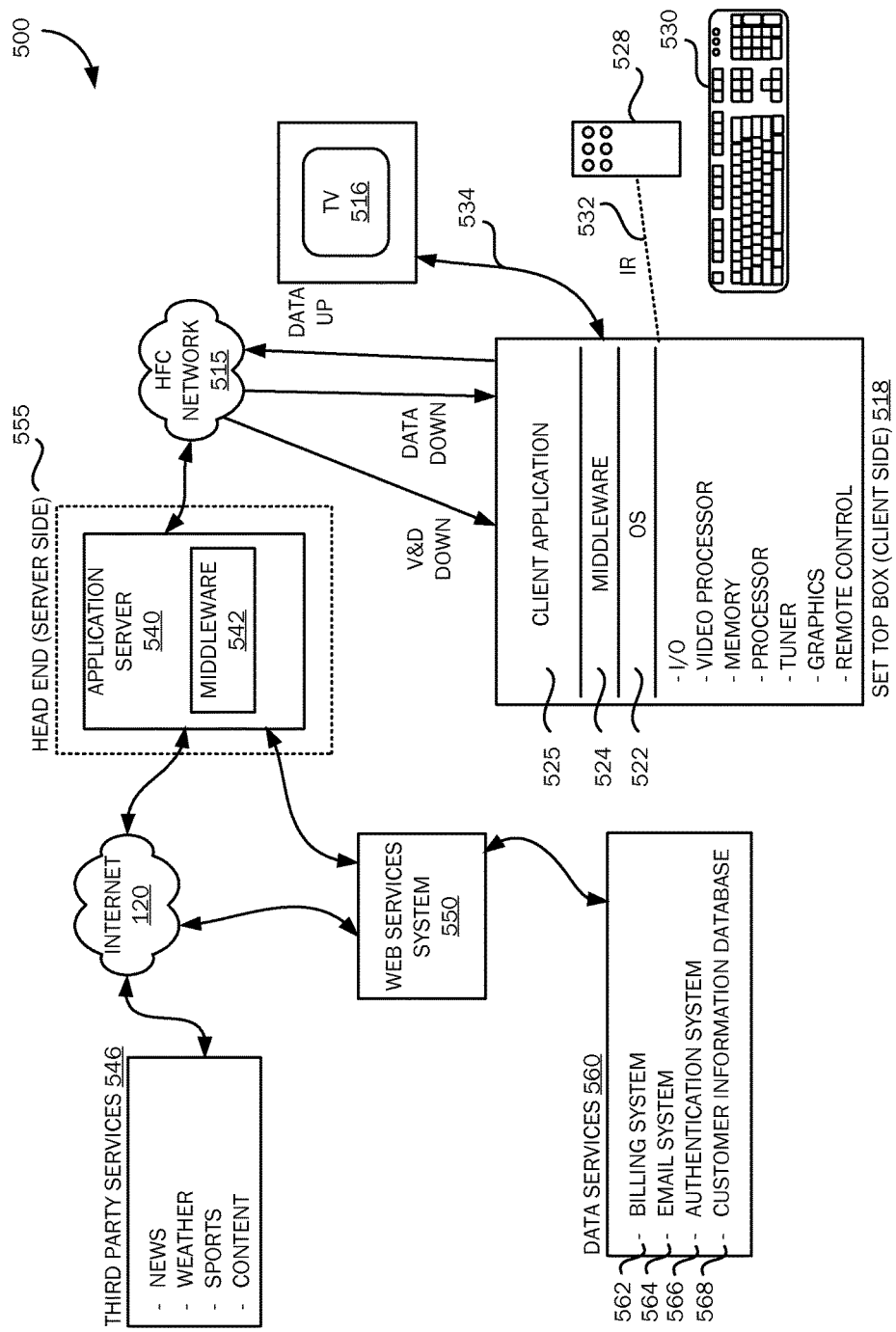

RECOMMENDATION SYSTEM BASED ON COMMON INTERESTS IN SOCIAL NETWORKS

CROSS-REFERENCE TO RELATED APPLICATIONS

The present application claims priority to U.S. Provisional Patent Application No. 61/788,701 titled "Recommendation System Based on Common Interests in Social Networks" filed Mar. 15, 2013, the disclosure of which is hereby incorporated by reference in its entirety.

BACKGROUND

Modern social networks provide services from wide-scale public social networks to more proprietary vertical systems of sharing information and content. Users of these various networks oftentimes have a large group of "friends," only a small percentage of which may actually be friends whom the user may regard as close friends or family members. A majority of a user's social networking friends may be comprised of more distant friends, relatives, and acquaintances about whom the user potentially knows very little.

It is common for various social media networks to provide social activity with information about various categories of interest of a user's social media friends. For example, what television shows, music, movies a social media friend "likes" or has listened to or watched, a restaurant a social media friend has eaten at and "liked," etc. Sometimes, such information may be of interest to or useful to a user, for example, if the user shares common interests or tastes in a particular category as the social media friend providing the information; however, this information may be intermingled with social activity and information from social media contacts with whom the user does not share common interests or tastes.

Currently, a user may be flooded with social activity and information from social media contacts who may not be able to provide beneficial or relevant recommendations on new media content, goods, or services for the user, and may also be unaware of other social media friends with who he may share common interests and tastes who could make relevant recommendations to the user. It is with respect to these and other considerations that the present invention has been made.

SUMMARY

Embodiments of the present invention may be utilized to compare consumption profiles of a user and his social networking friends, discover matches to the user, and provide content recommendations based on future content consumption or purchases by matched social media friends.

Current social networks and content delivery systems oftentimes track media content consumption data and/or purchases of various goods and services. This information may be utilized to help identify a subset of a user's existing base of contacts/social media friends who may have a degree of similarity of taste in a particular area or niche (e.g., interest in books, movies, TV shows, music, other goods, or services). Automated recommendations, advertisements, and other features and capabilities may be provided to the user based on the activity information and media consumption data of the subset of social media friends.

Embodiments may help to build human trust in a recommendation. For example, a recommendation based on an aggregate number of anonymous people on the Internet who may be considered "similar" to a user may potentially not be convincing to the user. However, a recommendation based on consumption data of an actual human friend or acquaintance with whom the user may already share similar interests may potentially be more influential to the user.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Referring now to the drawings in which like reference numbers represent corresponding parts throughout:

FIGS. 4A-4B illustrate a suitable mobile computing environment with which embodiments may be practiced; and FIG. 5 is a simplified block diagram illustrating a cable television services system architecture providing an operating environment according to an embodiment.

DETAILED DESCRIPTION

Figure 1:
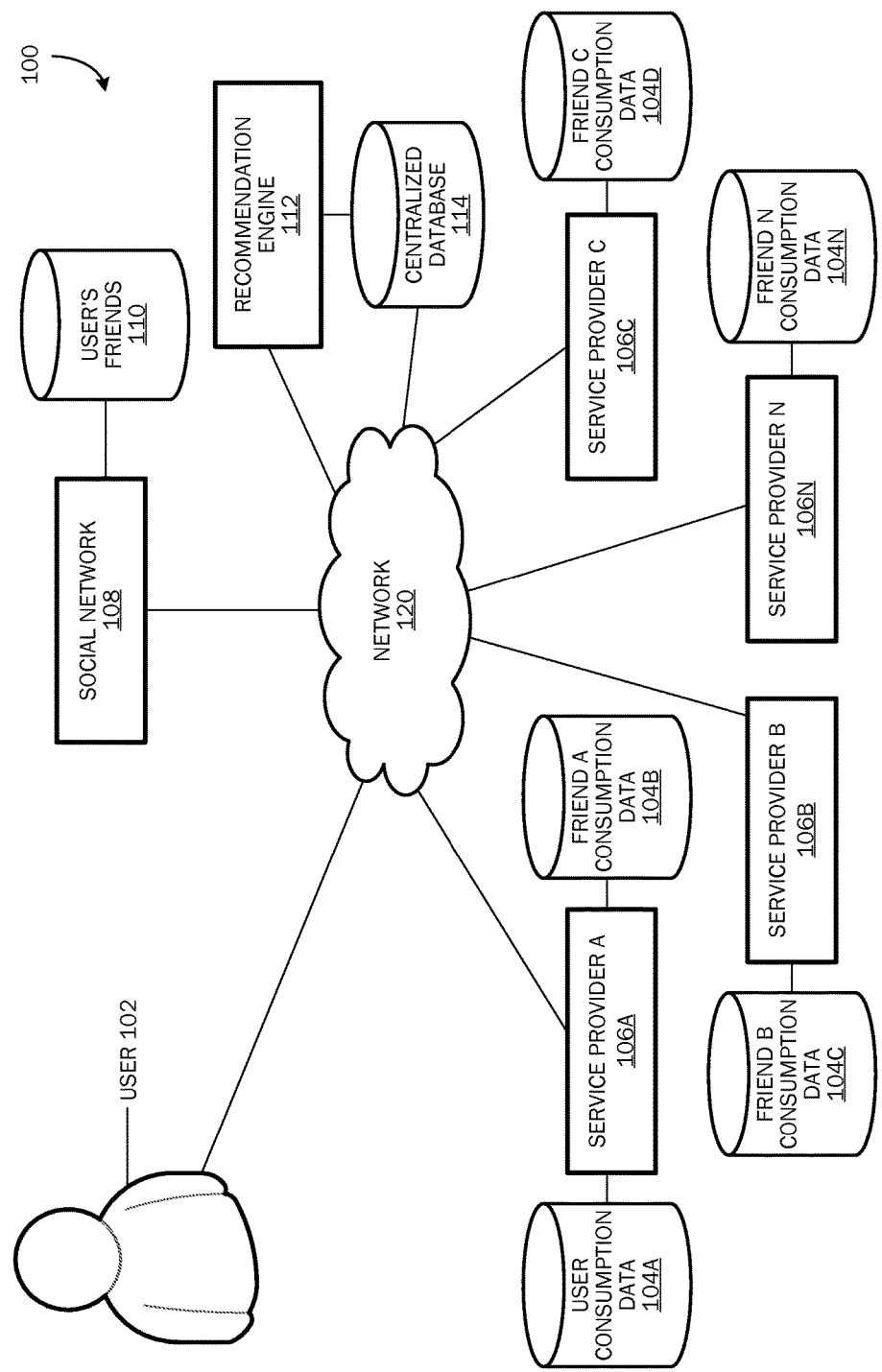
FIG. 1 is a simplified block diagram illustrating a system for providing recommendations based on common interests in social networks.

Embodiments provide recommendations based on common interests in social networks. As was described briefly above, users are oftentimes flooded with their social networking contacts' activity information, much of which may be associated with "friends" whom the user may not share common tastes or interests. Embodiments provide automated discovery of a user's existing social media friends whose tastes may match his, and to harness those social media friends for content recommendations. Embodiments may be utilized to help cut through the "clutter" of social activity information and to help enable a user to focus on recommendations from social media friends who have well matched tastes in a particular category of interest. It may be noted that the match may or may not be done on a 1-to-1 match basis. Further, the system may not be limited to examination on a per category basis, but may also consider the impact of one or several different categories when computing similarities. Recommendations may be issued for just one type of content, or may be issued for a profile of content preferences that may be applied across a broad cross-section of "categories of interest". For example, interest in a popular novel or series that may become a screenplay in the future could potentially result in a recommendation for the movie, or vice versa for the novel. According to an embodiment, recommendations may also be available for other types of content such as a musical score. The user may then be guided to purchase the new content where available through a variety of online or local retailers. Further, the system may also provide for informing the user and social media friends of their shared interests in an effort to build further real-world relationships or to help promote content recommendations between the user and social media friends.

While most cable multiple systems operators (MSOs), telephone companies (telcos), and satellite providers of television content may be able to collect and utilize users' media consumption data, such providers may not have enough individual nationwide market share that all of any one user's friends may be served by the same provider. Alternatively, a social network may possibly contain all or nearly all of a user's friends; however, such social networks may be stymied from making relevant recommendations because they may not be able to see all the video, movies, music, etc. that the user and his social media friends consume, but only those activities that users actively publish. Embodiments may utilize a collaboration of social network information (e.g., a user's social media contacts) and information provided by MSOs, telcos, and satellite providers (e.g., a user's consumption history) to provide social media friend-based recommendations.

Consider the following example scenario: User A "friends" User B on a social media network. User A and User B may be acquaintances, for example, co-workers from a previous job, former classmates, members of a non-profit organization, etc. Using embodiments of the present invention, television viewing of User A and User B may be monitored, and User A may be informed of a commonality in viewing habits between himself and User B. For example, while User A is watching a television program, a message may be presented to him such as, "User B shares 92% of your tastes in television programs. He is currently watching <Program X>, which you have not watched. Would you like to record it?" Accordingly, User A may select to record or watch the recommended program, and may potentially communicate with User B about their shared interests.

It should be noted, although many existing recommendation systems employ a "users who liked X will also like Y" sort of system, the "other users" are oftentimes people who are unknown to the user and may very likely wish to remain unknown for privacy purposes. Embodiments of the present invention provide recommendation from people who already have a social relationship with a user.

According to another embodiment, the system may also provide for a mechanism which monitors recommendation uptake on a per user basis. As a user makes a decision to consume or ignore a recommendation (or to halt recommended content during consumption and prior to completion), the system may observe such viewership behavior as feedback. This feedback data may be used to further refine the user's preferences towards particular genres and subgenres of the content. Future recommendation calculations may also have access to the feedback data when computing a next set of recommendations, which may be used to selectively promote or demote content. According to an embodiment the process of promoting or demoting the content may comprise weighting a subset of entries in a group of unique data.

According to another embodiment, the system may also have the capacity to interpret and execute a set of flexible business rules that may actively prioritize content. For example, certain content may be determined to be content that may hold a user's attention for longer than other content, or that may be determined to keep users coming back for more. This type of content, sometimes referred to as sticky content, may be prioritized according to business rules.

Embodiments may be provided to record the above mentioned viewership behavior using a variety of different metrics, which may include, but are not limited to, a direct positive or negative feedback, for example selection of a "like" or a "dislike" button, indirectly observing whether recommended content is ignored, consumed to completion; or stopped prior to completion. The above and other metrics may indicate varying degrees of interest, and/or may observably indicate agreement or disagreement with recommended content.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Although the below description is described as associated with video content recommendations, it should be appreciated that embodiments may be utilized for other types of content, goods, or services in other environments. For example, this could also work equally as well for automatically choosing music, choosing movies to watch at a theatre, choosing books to purchase, selecting products to advertise, etc.

Referring now to FIG. 1, a simplified block diagram illustrating a system 100 for providing recommendations based on common interests in a social network is shown. The system 100 may comprise a recommendation engine 112 operable to analyze a user's 102 consumption data 104A and consumption data 104 associated with the user's social network contacts; to calculate a correlation in one or more interest areas between the user 102 and the user's social network contacts; and to determine and provide media content recommendations based on the consumption data 104 associated with social network contacts of the user 102 who share a degree of commonality in one or more interest areas with the user 102.

A user 102 may be a member of and may access one or more social networks 108 via a network 120, such as the Internet. A social network 108 may be utilized to create a public or semi-public profile within a bounded system. A user may select other users (herein referred to as social network contacts 110) with whom he may share a connection (e.g., common interests, common social connections, common relationships, etc.), and view and traverse his collection of social network contacts and those connections of others within the system 108. The social network 108 may be accessed via a network 120, such as the Internet.

According to an embodiment, a user 102 may provide his social network credentials to a video services provider 106 such that the video services provider 106 may be able to retrieve a user's social network contact list 110 and attempt to match the list with a known database of the provider's customers to provide social network contact-based recommendations.

According to an embodiment, the user 102 and one or more of the user's social network contacts 110 may be consumers of a same service provider 106, wherein a service provider 106 may include a provider of media content (e.g., music; video, goods and services, books, etc.), for example, cable multiple systems operators (MSOs), telephone companies (telcos), satellite providers of television content, etc. The service provider 106 may collect and maintain consumption data 104, which may include video viewership records. The service provider 106 may store and maintain consumption data 104 in a local or remote database dedicated to the particular service provider 106. This embodiment is exemplified in FIG. 1 with service provider A 106A, the user 102, and social network contact A 110A. As illustrated, the user 102 and social network contact A 110A are both consumers of services provided by service provider A 106A; and service provider A 106A stores and maintains consumption data 104 associated with both users 102, 110A. According to an embodiment, the system 100 may correlate the consumption data 104 with its own record of previous recommendations to generate feedback for future recommendations.

According to another embodiment, a group of video service providers 106A, 106B, 106C, 106N may cooperate to provide social network contact-based recommendations. According to this embodiment, video viewership records (user consumption data 104) associated with a user 102 and one or more of the user's social network contacts may be collected from various service providers 106A, 106B, 106C, 106N. Consumption data 104 may be collected and stored in a centralized database 114. In the case of IP-based packetized video distribution, a centralized consumption monitoring system may be implemented as part a content distribution network (CDN) or master content request system. As can be appreciated, embodiments may include coordination on format of viewership records (user consumption data 104), privacy safeguards, and other technical measures to allow for rapid and secure data interchange, financial system linkages for any payment structures, etc.

Figure 2:
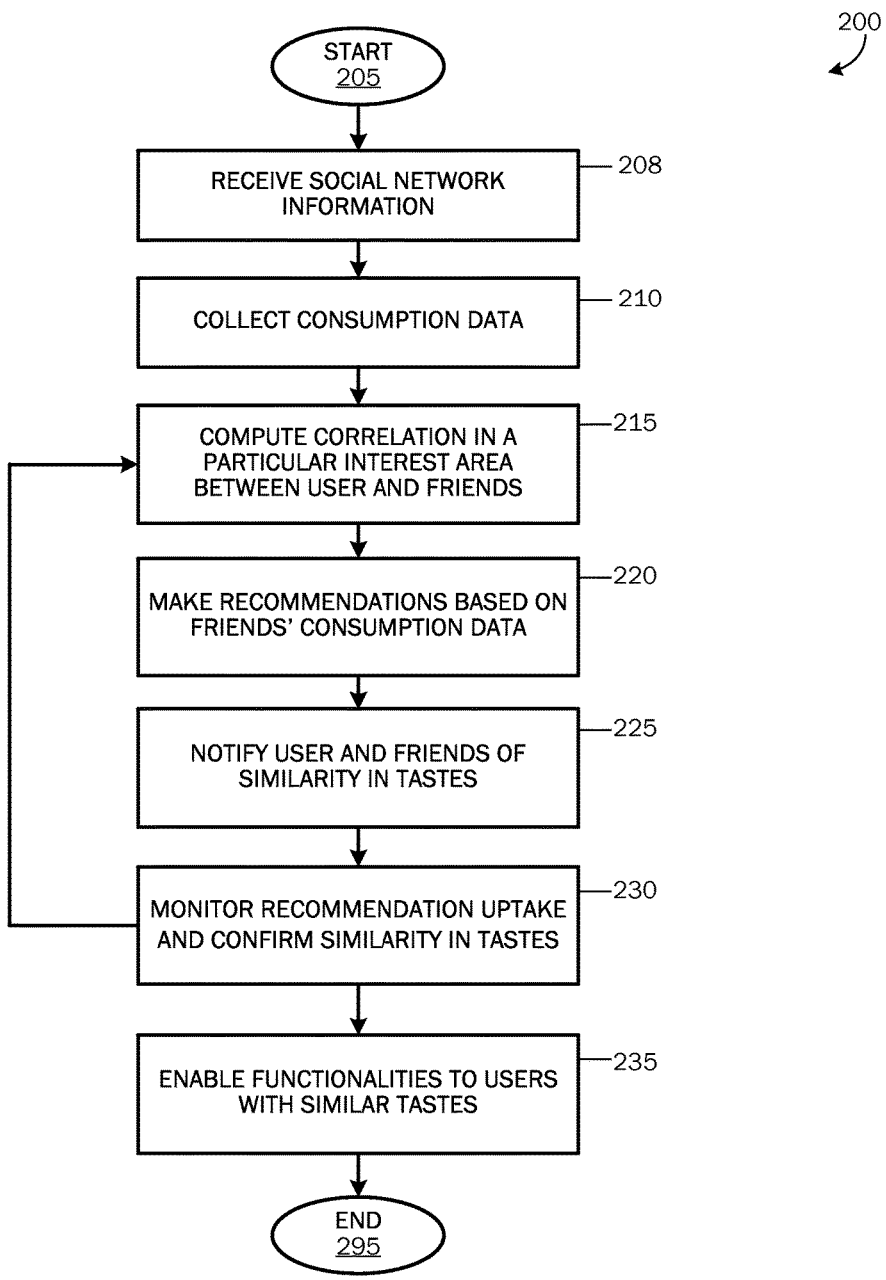
FIG. 2 is a flow chart of a method for providing recommendations based on common interests in social networks according to an embodiment.

Having described a system architecture 100, FIG. 2 is a flow chart of a method for providing social network contact-based recommendations based on common interests in a social network 108 according to an embodiment. The method 200 may begin at START OPERATION 205, and may proceed to OPERATION 208, where social network information may be received. The social network information may include permission by a user 102 to allow a service provider 106 to share and use consumption data 104 for social network contact-based recommendations, and may include social network credentials such that a list of the user's 102 social network contact s 110 may be identified. Permission to share and use consumption data 104 for social network contact-based recommendations may also be received from one or more of the user's social network contacts 110. Other information may also be received, such as user settings and preference data, etc.

The method 200 may proceed to OPERATION 210, where user consumption data 104 may be collected. Consumption data 104 associated with one or more particular areas of interest (e.g., television programming, video content, music content, electronic books, goods, organizational affiliations, hobbies, websites, blogs, services, etc.) may be collected. According to an embodiment, consumption data 104 for a user 102 and for the user's social network contacts 110 may be collected on an on-going basis. Consumption data 104 may include a listing of the content consumed by the user 102 and by one or more social network contacts 110 of the user 102, and may also include rating data provided by the user 102 and social network contacts 110 of the user 102.

OPERATION 210 may be performed via a variety of methods. According to one embodiment, for television video consumption, distributed, localized collection agents, for example, within a set top box (STB), may report individually back to a centralized database 114. According to another embodiment, centralized collection systems based on head end tuning records of switched digital video (SDV) systems may be aggregated into a central database 114. In the case of IP-based, packetized video distribution, a centralized consumption monitoring system may be implemented as part of the content distribution network (CDN) or master content request system. As can be appreciated, any number of similar methods may be utilized to capture media content that individual users 102,110 are consuming, for example, television programs that users 102,110 may watch on their television sets. Embodiments may be utilized to build a database 114 of content consumed by users 102,110 of the system 100.

According to embodiments, user consumption and preferences may be determined via a variety of methods. For example, user preference may be established via monitoring a self-reporting apparatus such as a "like" button; patterns in viewing behavior; measuring popularity of posts and taking note of the types of content, links, or keywords they contain; or similar indirect reporting metrics. The method 200 may proceed to OPERATION 215, where a correlation in a particular interest area between a user 102 and the user's network of social network contacts 110 may be computed. That is, a determination may be made as to which social network contacts 110 share a common interest in a particular area with the user 102. At OPERATION 220, recommendations may be made in a particular area of interest based on the consumption data 104 of social network contacts 110 who have been determined to share a commonality in the particular interest area or in another interest area with the user 102. An interest area may include, but is not limited to, television programming, video content, music content, electronic books, goods, organizational affiliations, hobbies, websites, blogs, services, etc. For example, a determination may be made that a user 102 and a social network contact 110 share an interest in movies. Accordingly, a recommendation for a certain movie, for example, a movie that the user 102 has watched but that his social network contact 110 has not watched, may be provided to the social network contact 110. The recommendation may be for the movie, or alternatively, may be for other types of content, products, services, hobbies, websites, blogs, etc., that may have an affiliation with the determination of similarity in movie interests. For example, the recommendation may be a recommendation for a book on which the movie is based.

OPERATIONS 215 and 220 may be performed by a variety of pattern matching and recommendation algorithms. Those skilled in the art may recognize that the approaches of collaborative filtering (i.e., basing similarities solely on the items consumed without needing information on the properties of the items), content-based filtering (i.e., basing similarities on the underlying properties or metadata associated with the items consumed), or hybrid methodologies (utilizing collaborative and content-based filtering) may be applied at OPERATIONS 215 and 220. Mathematical algorithms such as K-Nearest Neighbor, Pearson Correlation, Rocchio Relevance Filtering, and other algorithms may be employed to perform these computations without changing the underlying methodology of embodiments of the present invention.

As is commonly known by those skilled in the art, the K-Nearest Neighbor (k-NN) algorithm is a simple machine learning algorithm where an object is classified by a majority vote of its neighbors, with the object being assigned to the class most common amongst its k nearest neighbors (k is a positive integer, typically small). If k=1, then the object is simply assigned to the class of its nearest neighbor.

As is commonly known by those skilled in the art, the Pearson Correlation reflects the degree of linear relationship between two variables, and may range from +1 to −1. A correlation of +1 means that there is a perfect positive linear relationship between variables. A correlation of −1 means that there is a perfect negative linear relationship between variables. A correlation of 0 means there is no linear relationship between the two variables.

As is commonly known by those skilled in the art, Rocchio's method is a well-known algorithm associated with information retrieval, traditionally used for relevance feedback and for document routing, based on an assumption that most users have a general conception of which documents should be denoted as relevant or non-relevant.

OPERATION 215 may be performed on a regular basis, for example, to determine whether a user 102 and a social network contact's 110 tastes may be drifting apart or whether new social network contacts 110 may have similar tastes, etc. According to an embodiment, correlation may include either system-wide or user-configurable thresholds for determining how close a social network contact's tastes may be to a user's 102 tastes before being considered useful for social network contact-based recommendations. According to another embodiment, correlation may be constructed such that a predetermined number of social network contacts 110 with a highest correlation value (top 2, top 5, etc.) may be used. According to another embodiment, correlation may be constructed in a hybrid manner.

OPERATION 220 may be performed as frequently as needed for a user's 102 consumption behavior. According to one embodiment, frequent automated recommendations based on social network contacts 110 with similar tastes may be provided in an always-present user interface that the user 102 may see constantly, or may be optional for whenever the user 102 manually selects to see recommendations either from all his social network contacts 110, a subset of social network contacts 110, or from a particular social network contact 110. OPERATION 220 may also be accomplished more indirectly as part of a general purpose recommendation engine implementation by factoring "social network contacts with similar tastes" into the general purpose recommendation engine with a higher weighting.

The method 200 may proceed to OPERATION 225, where a notification may be provided to the user 102 and/or to one or more of the social network contacts 110 of the user 102 with whom the user 102 shares a similarity in tastes. The notification may be provided in various formats and may contain a variety of information. For example, the notification may be a message displayed on a user interface of a viewing device, an email, a text message sent to the user's 102,110 communication device, a category of content (e.g., "Recommendations from your Friends"), a message posted to a contact's social network page, etc. The notification may include one or more content recommendations, may include a listing of social network contacts 110 on whose consumption data 104 a recommendation is based, a selectable functionality to send a message to or chat with a social network contact 110, a percentage of similarity of tastes, etc.

Identification of a social network contact 110 with whom the user 102 shares a similar interest may be provided in a user interface via in a number of ways, for example, a column heading of "Movies that <user> Likes", a bar graph showing the top 3 users (social network contacts 110) and their correlation scores, a message corresponding to the social network contacts 110 that pops up when the user 102 hovers over a recommendation, or any number of other methods. As can be appreciated, various privacy safeguards may be put into place, for example, since some individuals may be embarrassed if some of their viewing history were visible to others without an explicit opt-in.

According to an embodiment, OPERATION 225 may provide a potential human social benefit of merely identifying which social network contacts actually share common interests. For example, according to some statistics, an average person on a social network site 108 may have an average of 229 social network contacts. Many users 102 may be fascinated to know with which one or two individuals of the group of social network contacts 110 he may have the closest music tastes, with which social network contacts 110 he may have the closest tastes in movies, with which social network contacts 110 he may have the closest taste in restaurants, etc. In many cases, it may potentially be someone the user 102 did not expect, which may encourage the user 102 to socialize with a different group of social network contacts 110 than he might traditionally have in the past.

The method 200 may then proceed to OPERATION 230, where recommendations uptake may be monitored on a per user basis, and similarities in tastes may be confirmed based on whether the user 102 provides feedback (e.g., via a selection of a "like" or "dislike" button, etc.), ignores the recommendation, consumes the recommended content, or halts the recommended content during consumption and prior to completion. The above behavior may be converted to feedback data which in turn may be utilized to confirm the similarities or dissimilarities in tastes. The feedback data derived from OPERATION 230 may be used in OPERATION 215 to make future recommendations to the user 102. Feedback data may be used in recommendations calculations when computing a next set of recommendations. For example, content may be promoted or demoted according to feedback data.

The method 200 may proceed to OPERATION 235, where additional functionalities may be enabled to the user 102 and/or to the social network contacts 110 who have similar tastes as the user 102. For example, a functionality may be provided for allowing a social network contact 110 to manually push specific recommendations to the user 102. Once a user 102 discovers some closely shared niche interest with a social network contact 110, it may be likely that the user 102 and the social network contact 110 may want to more regularly communicate or take actions based on the shared interest. According to embodiments, additional functionalities that may be enabled may include, but are not limited to, allowing a user 102 to select to emphasize recommendations from particular social network contacts 110; email notifications sent on a periodic basis including a listing of programs that a social network contact 110 has watched, but that the user 102 has not; providing a selectable option to watch (or listen to) what a social network contact 110 is currently watching (or listening to), which when selected, may automatically tune the user's device to a program currently being watched by the social network contact 110; providing a list of programs that the user 102 and a social network contact 110 have both seen (for example, providing a commonality about which to communicate if desired); etc. According to an embodiment, the system 100 may present recommendations to the user 102 in the context of the social network 108 either via a "public profile" that faces all of the social network's 108 participants or via the private profile that the user 102 uses to access the social network 108, and may therefore be used to grant the system access. As can be appreciated, recommendations made the above way may serve to spark connection between otherwise disinterested or loosely affiliated users, despite their common interests. Other functionalities may be enabled, such as providing advertisements for a user 102 based on consumption data 104, recommendations, and/or discovered areas of interest. The method 200 may end at OPERATION 295.

Figure 3:
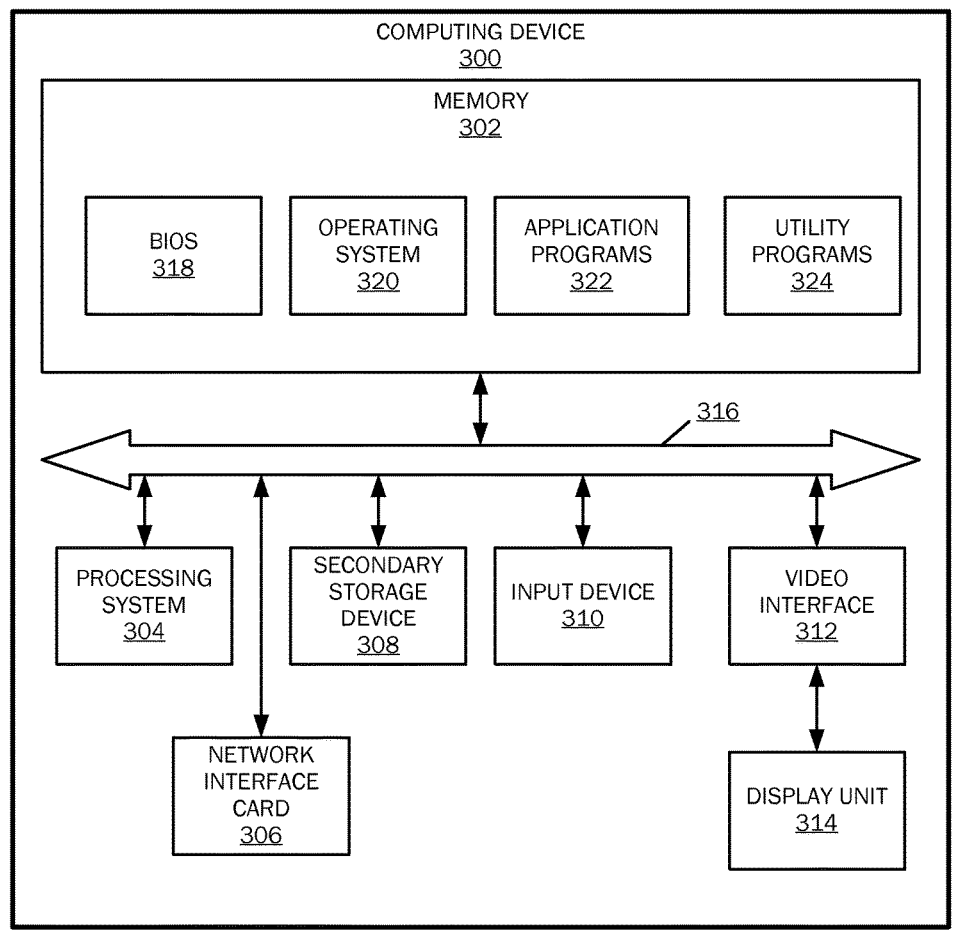
FIG. 3 is a block diagram illustrating example physical components of a computing device with which embodiments may be practiced.

FIG. 3 is a block diagram illustrating example physical components of a computing device 300 with which embodiments may be practiced. In some embodiments, one or a combination of the components of the recommendation system 112 may be implemented using one or more computing devices like the computing device 300. It should be appreciated that in other embodiments, one or a combination of the components of the social network contact-based recommendation system 112 may be implemented using computing devices having hardware components other than those illustrated in the example of FIG. 3.

Computing devices may be implemented in different ways in different embodiments. For instance, in the example of FIG. 3, the computing device includes a processing system 304, memory 302, a network interface 306, a secondary storage device 308, an input device 310, a video interface 312, a display unit 314, and a communication medium 316. In other embodiments, the computing device 300 may be implemented using more or fewer hardware components (e.g., a video interface, a display unit, or an input device) or in combination with other types of computer systems and program modules. The memory 302 includes one or more computer-readable media. According to one embodiment, the recommendation engine 112 may be stored locally on computing device 300. Memory 302 thus may store the computer-executable instructions that, when executed by processor 304, provide social network contact-based recommendations as described above with reference to FIGS. 1-2.

In various embodiments, the memory 302 is implemented in various ways. For example, the memory 302 can be implemented as various types of computer-readable media. According to embodiments, the term computer-readable media includes two different types of media including communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users, for example, one or more components of the social network/common interest recommendation system 100. The memory 302 also stores one or more utility programs 324 that, when executed by the processing system 304, cause the computing device 300 to provide utilities to other software programs. Embodiments of the present invention may be utilized in various distributed computing environments where tasks are performed by remote processing devices that are linked through a communications network in a distributed computing environment.

FIGS. 4A-4B illustrate a suitable mobile computing environment, for example, a mobile computing device 400, a mobile phone, a tablet personal computer, a laptop computer, and the like, with which embodiments may be practiced. The mobile computing device 400 is illustrative of any suitable device operative to send, receive and process wireless communications according to embodiments of the present invention. A display screen 405 is operative for displaying a variety of information such as information about incoming and outgoing communications, as well as, a variety of data and displayable objects, for example, text, alphanumeric data, photographs, and the like.

Data input to the device 400 may be performed via a variety of suitable means, such as, touch screen input via the display screen 405, keyboard or keypad input via a data entry area 410, key input via one or more selectable buttons or controls 415, voice input via a microphone 418 disposed on the device 400, photographic input via a camera 422 functionality associated with the mobile computing device, or any other suitable input means. Data may be output via the device 400 via any suitable output means, including but not limited to, display on the display screen 405, audible output via an associated speaker 430 or connected earphone system, vibration module for providing tactile output, and the like.

Referring now to FIG. 4B, operational unit 435 is illustrative of internal operating functionality of the mobile computing device 400. A processor 440 is illustrative of a general purpose computer processor for processing incoming and outgoing data and communications and controlling operation of the device and associated software applications via a mobile computing device operating system. Memory 445 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the social network contact-based recommendation system may be stored locally on mobile computing device 400.

Mobile computing device 400 may contain an accelerometer 455 for detecting acceleration, and can be used to sense orientation, vibration, and/or shock. Mobile computing device 400 may contain a global positioning system (GPS) system (e.g., GPS send/receive functionality) 460. A GPS system 460 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 450 include all required functionality, including onboard antennae, for allowing the device 400 to communicate with other communication devices and systems via a wireless network. Radio functions 450 may be utilized to communicate with a wireless or WIFI-based positioning system to determine a device's 400 location.

FIG. 5 is a simplified block diagram illustrating a cable television services system 500 (hereafter referred to as "CATV") architecture providing an operating environment according to an embodiment. As can be appreciated, a CATV architecture is but one of various types of systems that may be utilized to provide substituted VOD content. Referring now to FIG. 5, digital and analog video programming, information content and interactive television services are provided via a hybrid fiber coax (HFC) network 515 to a television set 516 for consumption by a cable television/services system customer. As is known to those skilled in the art, HFC networks 515 combine both optical fiber and coaxial cable lines. Typically, optical fiber runs from the cable head end 555 to neighborhoods of subscribers. Coaxial cable runs from the optical fiber feeders to each customer or subscriber. The functionality of the HFC network 515 allows for efficient bidirectional data flow between the client-side set-top box 518 and a server-side application server 540.

The CATV system 500 is in the form of a distributed client-server computing system for providing video and data flow across the HFC network 515 between server-side services providers (e.g., cable television/services providers) via a server-side head end 555 and a client-side customer via a client-side set-top box (STB) 518 functionally connected to a customer receiving device, such as the television set 516. As is understood by those skilled in the art, modern CATV systems 500 may provide a variety of services across the HFC network 515 including traditional digital and analog video programming, telephone services, high speed Internet access, video-on-demand, and information services.

On the client side of the CATV system 500, digital and analog video programming and digital and analog data are provided to the customer television set 516 via the set-top box (STB) 518. Interactive television services that allow a customer to input data to the CATV system 500 likewise are provided by the STB 518. As illustrated in FIG. 5, the STB 518 is a multipurpose computing device having a computer processor, memory, and an input/output mechanism. The input/output mechanism receives input from server-side processes via the HFC network 515 and from customers via input devices such as the remote control device 528, keyboard 530, or other computing device, such as a tablet/slate computer, smart phone, etc. The remote control device 528 and the keyboard 530 may communicate with the STB 518 via a suitable communication transport such as the infrared connection 532. The STB 518 also includes a video processor for processing and providing digital and analog video signaling to the television set 516 via a cable communication transport 534. A multi-channel tuner is provided for processing video and data to and from the STB 518 and the server-side head end system 555, described below.

The STB 518 also includes an operating system 522 for directing the functions of the STB 518 in conjunction with a variety of client applications 525. For example, if a client application 525 requires a news flash from a third-party news source to be displayed on the television 516, the operating system 522 may cause the graphics functionality and video processor of the STB 518, for example, to output the news flash to the television 516 at the direction of the client application 525 responsible for displaying news items. According to embodiments, the operating system 522 may include one or more components of the social network/common interest recommendation system 100 as described herein.

Because a variety of different operating systems 522 may be utilized by a variety of different brands and types of set-top boxes, a middleware layer 524 may be provided to allow a given software application to be executed by a variety of different operating systems. According to an embodiment, the middleware layer 524 may include a set of application programming interfaces (APIs) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 518. The middleware layer 542 of the server-side application server and the middleware layer 524 of the client-side STB 518 may format data passed between the client side and server side according to the Extensible Markup Language (XML).

According to one embodiment, the set-top box 518 passes digital and analog video and data signaling to the television 516 via a one-way communication transport 534. According to other embodiments, two-way communication transports may be utilized, for example, via high definition multimedia (HDMI) ports. The STB 518 may receive video and data from the server side of the CATV system 500 via the HFC network 515 through a video/data downlink and data via a data downlink. The STB 518 may transmit data from the client side of the CATV system 500 to the server side of the CATV system 500 via the HFC network 515 via one data uplink. The video/data downlink is an "in band" downlink that allows for digital and analog video and data signaling from the server side of the CATV system 500 through the HFC network 515 to the set-top box 518 for use by the STB 518 and for distribution to the television set 516. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 5, between the HFC network 515 and the set-top box 518 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 518 and the server-side application server 540 is typically passed through the "out of band" data links. Alternatively, an "in band" data carousel may be positioned in an "in band" channel into which a data feed may be processed from the server-side application server 540 through the HFC network 515 to the client-side STB 518. Operation of data transport between components of the CATV system 500, described with reference to FIG. 5, is well known to those skilled in the art.

Referring still to FIG. 5, the head end 555 of the CATV system 500 is positioned on the server side of the CATV system and includes hardware and software systems responsible for originating and managing content for distributing through the HFC network 515 to client-side STBs 518 for presentation to customers via televisions 516. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 518 via the HFC network 515. As described above with reference to the set-top box 518, the application server 540 includes a middleware layer 542 for processing and preparing data from the head end of the CATV system 500 for receipt and use by the client-side set-top box 518. For example, the application server 540 via the middleware layer 542 may obtain data from third-party services 546 via the Internet 120 for transmitting to a customer through the HFC network 515 and the set-top box 518. For example, content metadata a third-party content provider service may be downloaded by the application server via the Internet 120. When the application server 540 receives the downloaded content metadata, the middleware layer 542 may be utilized to format the content metadata for receipt and use by the set-top box 518. Therefore, content metadata may be sent and categorized based on the availability to the customer's program guide data.

According to one embodiment, data obtained and managed by the middleware layer 542 of the application server 540 is formatted according to the Extensible Markup Language and is passed to the set-top box 518 through the HFC network 515 where the XML-formatted data may be utilized by a client application 525 in concert with the middleware layer 524, as described above. As should be appreciated by those skilled in the art, a variety of third-party services data, including news data, weather data, sports data and other information content may be obtained by the application server 540 via distributed computing environments such as the Internet 120 for provision to customers via the HFC network 515 and the set-top box 518.

According to embodiments, the application server 540 obtains customer support services data, including billing data, information on customer work order status, answers to frequently asked questions, services provider contact information, and the like from data services 560 for provision to the customer via an interactive television session. As illustrated in FIG. 5, the services provider data services 560 include a number of services operated by the services provider of the CATV system 500 which may include data on a given customer.

A billing system 562 may include information such as a customer's name, street address, business identification number, Social Security number, credit history, and information regarding services and products subscribed to by the customer. According to embodiments, the billing system 562 may also include billing data for services and products subscribed to by the customer for bill processing, billing presentment and payment receipt.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

Referring still to FIG. 5, web services system 550 is illustrated between the application server 540 and the data services 560. According to embodiments, web services system 550 serves as a collection point for data requested from each of the disparate data services systems comprising the data services 560. According to embodiments, when the application server 540 requires customer services data from one or more of the data services 560, the application server 540 passes a data query to the web services system 550. The web services system formulates a data query to each of the available data services systems for obtaining any required data for a requesting customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer data. The customer data obtained by the web services system is assembled and is returned to the application server 540 for ultimate processing via the middleware layer 542, as described above.

An authentication system 566 may include information such as secure user names, subscriber profiles, subscriber IDs, and passwords utilized by customers for access to network services. As should be understood by those skilled in the art, the disparate systems 562, 564, 566, 568 may be integrated or provided in any combination of separate systems, wherein FIG. 5 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing social network contact-based recommendations, the method comprising:
    automatically discovering at least one social network contact of a user who shares a common taste with the user in one or more interest areas by:
        receiving a listing of social network contacts of the user, wherein the user and one or more of the social network contacts are subscribers of a service provided by a service provider;
        matching the one or more of the social network contacts from the listing with subscribers of the service provider;
        collecting, via the service provider, consumption data of the user and each of the matched social network contacts, wherein the consumption data includes a listing of content consumed from the service provider by the user and a listing of content consumed from the service provider by each of the matched social network contacts;
        computing, from the consumption data, a correlation in the one or more interest areas between the user and each of the matched social network contacts by determining a correlation score for a similarity between the consumption data of the user and each of the matched social network contacts in the one or more interest areas; and
        in response to determining the correlation score between the user and at least one social network contact from the matched social network contacts meets a predetermined threshold in the one or more interest areas, determining that the at least one social network contact shares a common taste with the user in the one or more interest areas; and providing recommendations that reflect the shared common taste in the one or more interest areas to the user, the recommendations based on the consumption data of the user and the at least one social network contact.

2. The method of claim 1, wherein receiving the listing of social network contacts of the user comprises receiving social network credentials and retrieving the listing of the social network contacts.

3. The method of claim 1, wherein providing the recommendations in the one or more interest areas comprises providing the recommendations in one or more of:
   television programming;
   video content;
   music content;
   electronic books;
   goods;
   services;
   organizational affiliations;
   hobbies;
   websites; or
   blogs.

4. The method of claim 1, wherein providing the recommendations in the one or more interest areas comprises providing a recommendation via a message displayed on a display device.

5. The method of claim 1, wherein providing the recommendations in the one or more interest areas comprises providing a recommendation via a message posted to a social media page of the user.

6. The method of claim 1, further comprising providing a selectable functionality with a recommendation from among the recommendations, which when selected tunes the user's device to content currently being watched or listened to by the at least one social network contact associated with the recommendation.

7. The method of claim 1, further comprising:
   after determining a correlation score in the one or more interest areas between the user and each of the matched social network contacts, ranking the matched social network contacts in order according to the correlation score; and
   determining a top predetermined number of highest ranking social network contacts that share a particular correlation in a particular interest area.

8. The method of claim 1, further comprising providing a selectable functionality with a recommendation from among the recommendations, which when selected allows the user to chat with the at least one social network contact associated with the recommendation.

9. The method of claim 1, further comprising providing an automated periodic email to the user comprising a listing of one or more of:
   media content the at least one social network contact has consumed that the user has not; or
   media content the at least one social network contact has consumed that the user also has consumed.

10. The method of claim 1, further comprising providing a functionality for allowing the at least one social network contact to manually provide one or more recommendations to the user.

11. The method of claim 1, further comprising providing a functionality for allowing the user to highlight recommendations provided by the at least one social network contact.

12. The method of claim 1, wherein providing the recommendations-comprises providing a percentage of the correlation between the consumption data of the user and the at least one social network contact in the one or more interest areas.

13. The method of claim 1, wherein providing the recommendations further comprises interpreting and executing flexible business rules that actively prioritize content.

14. A system for providing social network contact-based recommendations, the system comprising:
   a memory storage; and
   a processing unit coupled to the memory storage, wherein the processing unit is operable to:
      automatically discover at least one social network contact of a user who shares a common taste with the user in one or more interest areas by:
         receiving a listing of social network contacts of the user, wherein the user and one or more of the social network contacts are subscribers of a service provided by a service provider;
         matching the one or more of the social network contacts from the listing with subscribers of the service provider;
         collecting, via the service provider, consumption data of the user and each of the matched social network contacts, the consumption data including a listing of content consumed from the service provider by the user and a listing of content consumed from the service provider by each of the matched social network contacts;
         computing, from the consumption data, a correlation in the one or more interest areas between the user and each of the matched social network contacts by determining a correlation score for a similarity between the consumption data of the user and each of the matched social network contacts in the one or more interest areas; and
         in response to determining the correlation score between the user and at least one social network contact from the matched social network contacts meets a predetermined threshold in the one or more interest areas, determining that the at least one social network contact shares a common taste with the user in the one or more interest areas; and
      provide recommendations that reflect the shared common taste in the one or more interest areas to the user, the recommendations based on the consumption data of the user and the at least one social network contact.

15. The system of claim 14, wherein the processor is further operable to receive social network credentials and retrieve the listing of the social network contacts of the user.

16. The system of claim 14, wherein the one or more interest areas comprise one or more of:
   television programming;
   video content;
   music content;
   electronic books;
   goods;
   services;
   websites; or
   blogs.

17. The system of claim 14, wherein the processor is further operable to:
   after determining the correlation score for the similarity between the consumption data of the user and each of the matched social network contacts in the one or more interest areas, rank each of the matched social network contacts in order according to the correlation score; and determine a top predetermined number of highest ranking social network contacts that share a particular correlation in a particular interest area.

18. The system of claim 14, wherein the processor is further operable to provide one or more of:
- a selectable functionality with a recommendation from among the recommendations, which when selected tunes the user's device to content currently being watched or listened to by the at least one social network contact associated with the recommendation;
- a selectable functionality with a recommendation from among the recommendations, which when selected allows the user to chat with the at least one social network contact associated with the recommendation;
- an automated periodic email to the user comprising a listing of one or more of:
  - media content the at least one social network contact has consumed that the user has not; or
  - media content the at least one social network contact has consumed that the user also has consumed;
- a functionality for allowing the at least one social network contact to manually provide one or more recommendations to the user; or
- a functionality for allowing the user to highlight recommendations provided by the at least one social network contact.

19. A non-transitory computer-readable memory device which stores a set of instructions which when executed performs a method for providing social network contact-based recommendations, the method executed by the set of instructions comprising:
- automatically discovering at least one social network contact of a user who shares a common taste with the user in one or more interest areas by:
  - receiving a listing of social network contacts of the user, wherein the user and one or more of the social network contacts are subscribers of a service provided by a service provider;
  - matching the one or more of the social network contacts from the listing with subscribers of the service provider;
  - collecting, via the service provider, consumption data of the user and each of the matched social network contacts, wherein the consumption data includes a listing of content consumed from the service provider by the user and a listing of content consumed from the service provider by each of the matched social network contacts;
  - computing, from the consumption data, a correlation in the one or more interest areas between the user and each of the matched social network contacts by determining a correlation score for a similarity between the consumption data of the user and each of the matched social network contacts in the one or more interest areas; and
  - in response to determining the correlation score between the user and at least one social network contact from the matched social network contacts meets a predetermined threshold in the one or more interest areas, determining that the at least one social network contact of the user shares a common taste with the user in the one or more interest areas; and
- providing recommendations that reflect the shared common taste in the one or more interest areas to the user, the recommendations based on the consumption data of the user and the at least one social network contact.

20. The non-transitory computer-readable memory device of claim 19, wherein computing a correlation in the one or more interest areas between the user and each of the matched social network contacts further comprises:
- after determining the correlation score for the similarity between the consumption data of the user and each of the matched social network contacts in the one or more interest areas, ranking the matched social network contacts in order according to the correlation score and determining a top predetermined number of highest ranking social network contacts that share a particular correlation in a particular interest area.

21. The non-transitory computer-readable memory device of claim 19, further comprising providing one or more of:
- a selectable functionality with a recommendation from among the recommendations, which when selected tunes the user's device to content currently being watched or listened to by the at least one social network contact associated with the recommendation;
- a selectable functionality with a recommendation from among the recommendations, which when selected allows the user to chat with the at least one social network contact associated with the recommendation;
- an automated periodic email to the user comprising a listing of one or more of:
  - media content the at least one social network contact has consumed that the user has not; or
  - media content the at least one social network contact has consumed that the user also has consumed;
- a functionality for allowing the at least one social network contact to manually provide one or more recommendations to the user; or
- a functionality for allowing the user to highlight recommendations provided by the at least one social network contact.

22. The method of claim 1, further comprising utilizing feedback data based on the recommendations to then refine preferences of the user for content.

* * * * *